May 24, 1955 F. W. HANKS 2,708,910

METER DISC CONSTRUCTION

Filed March 23, 1951

INVENTOR.
FREDERICK W. HANKS.
BY
Oberlin & Limbach.
ATTORNEYS.

United States Patent Office 2,708,910

Patented May 24, 1955

2,708,910

METER DISC CONSTRUCTION

Frederick W. Hanks, Cleveland, Ohio

Application March 23, 1951, Serial No. 217,219

4 Claims. (Cl. 121—69.5)

A common form of measuring element in fluid meters is the nutating disc. Usually, this is a circular disc held between two hemispheres as bearing portion, the disc in some cases being coned out of a simple plane, and a spindle projects from one of the hemispheres to actuate register mechanism as the disc nutates. In general, these discs have been held in assembly by screw-thread fittings involving the spindle. On account of wear it is occasionally necessary to disassemble the disc and replace a hemisphere. Where screw-threaded assembly fitting is employed, difficulties are occasionally encountered by reason of rusting or corrosion in the threads. In Patent No. 1,073,387 it was proposed to permanently fasten two hemispheres together by a tubular rivet, and then press fit the spindle into the tubular rivet. As can be seen, such construction while eliminating screw-threads runs into a disadvantage of having the hemispheres permanently assembled instead of permitting easy replacement of one which may be worn. In the present invention a construction may be had however which, while avoiding screw-threaded fitting, also makes possible the easy disassembly and substitution of a hemisphere as desired. And such a disc is easily and quickly put together, and may be easily and quickly reconditioned, eliminating wastage of parts which might otherwise occur, and withal offering savings in cost of labor and materials. Other objects and advantages will appear from the following description.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figures 1, 2, 3:
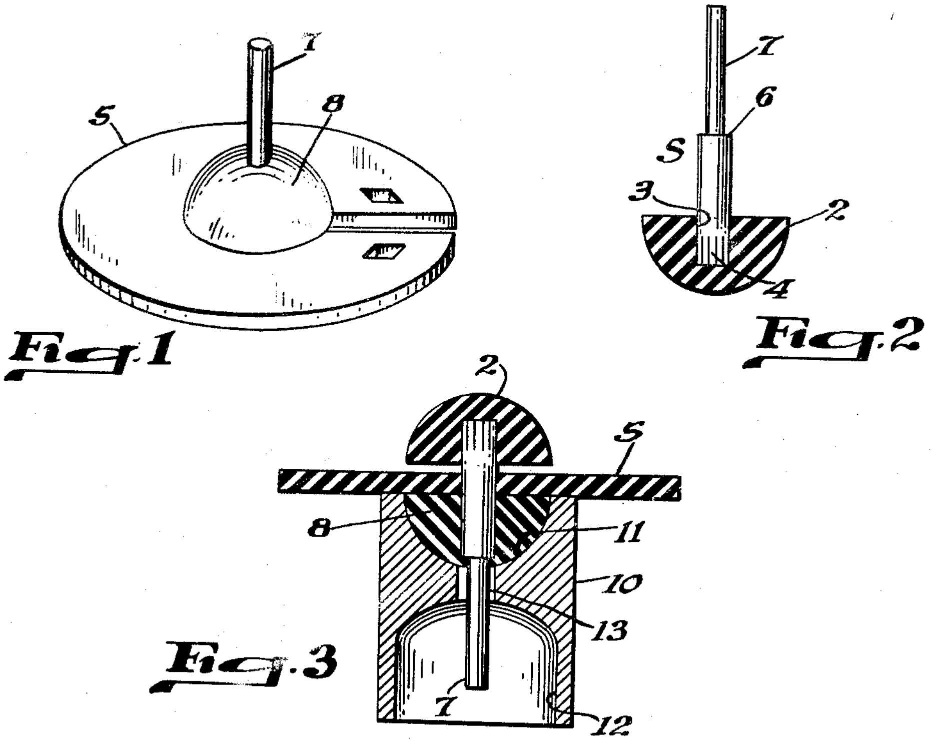
Fig. 1 is a perspective view of a meter disc embodying the invention.
Fig. 2 is a sectional view coaxial with the spindle, showing the attachment thereof to one hemisphere.
Figs. 3 and 4 are sectional views, illustrating assembly and repair.

In general, the elements, including the hemispheres and spindle and disc are held together by force-fit involving only the elements directly, and wholly eliminating any additional securing means whether screw-threads, rivets, etc. One hemisphere 2, Fig. 2, is provided with a recess 3 of generally cylindrical form, and the spindle S has one end 4 knurled or serrated, and the spindle is assembled then with such hemisphere by forcing the spindle end into the recess. This forms, by contacting-surface deformation, a union between spindle and hemisphere which is particularly firm and resistant against disassembly. If the knurling or serration of the end of the spindle be omitted, it can still be force-fitted to the hemisphere with a highly satisfactory firmness of union but which will more readily permit disassembly if desired.

Figure 4:
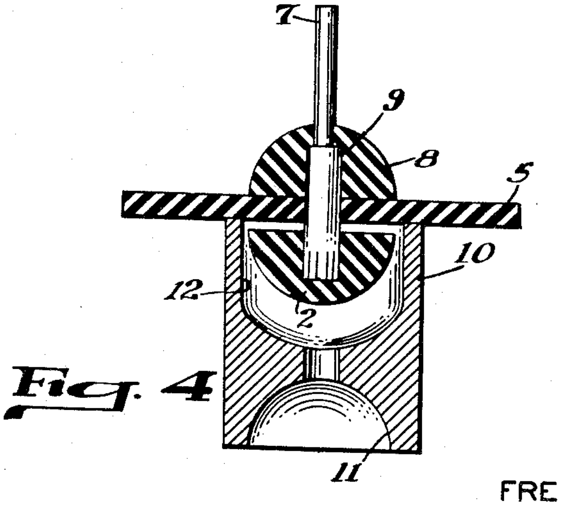

It will be understood of course that the serration instead of being on the spindle which is usually of metal, can be in the recess of the hemisphere, although less desirably. The hemispheres, and the disc 5 are most usually made of hard rubber compositions or equivalent plastics, these kinds of materials being particularly resistant against rusting and corrosion by fluids which come in contact. The spindle S has at some intermediate point a shoulder 6 and thence a reduced diameter 7. The disc 5, Fig. 3, has a central perforation, and the other hemisphere 8 has a bore in alignment, and with a shoulder 9, Fig. 4, the converse of the shoulder 6 of the spindle. The spindle with the attached hemisphere 2 is assembled with the disc and other hemisphere 8 by forcing the spindle through the aligned openings in the disc and other hemisphere. Conveniently, this may be done as indicated in Fig. 3 by means of auxiliary equipment or anvil 10 of metal, which has a hemispherical recess 11 in one end and a deepened recess 12 in the other, with an opening 13 between. Thus, with the hemisphere 8 and disc 5 positioned on the special anvil 10, the spindle with its attached disc 2 may be inserted and forced in final contact assembly with the disc 5 and hemisphere 8. The parts are thus held tightly together by force-fit between the spindle and the other elements, but it is possible to dislodge and disassemble the elements if subsequently at any time required. For this, the disc may be placed on the large recess 12 of the recessed anvil 10, and by tapping with a hammer on the upper end 7 of the spindle, the spindle may be driven out of the hemisphere 8 and disc. A substitute for one or both parts as required may be then made up into full reassembly, thus making possible easy and quick reconditioning. In all cases where the end 4 of the spindle is knurled or serrated, disengagement at such point is more difficult than with the force-fitted union between the spindle and the other hemisphere, and in some instances this is of particular advantage in facilitating selective disassembly. Irrespective of presence or absence of knurling, the device is characterized by simplicity of union, and the possibility of easy and rapid initial assembly or interchange of elements subsequently; and in dealing with hemisphere material such as hard rubber, in contrast to a heating operation for softening, the present invention does not require any temperature state other than ordinary temperature.

Other modes of applying the principle of the invention may be employed, change being made as regards the details described, provided the features stated in any of the following claims or the equivalent of such be employed.

I therefore particularly point out and distinctly claim as my invention:

1. A disc piston for fluid meters comprising a disc having a central perforation, first and second hemispherical bearing parts made of hard rubber arranged against opposite sides of said disc so as to form a sphere, said first bearing part being formed with a recess extending axially inwardly from its base surface which overlies the disc, the second bearing part being formed with an axial passageway extending completely therethrough, and a spindle operative to secure the thus assembled bearing parts and disc firmly together, one end of said spindle being received in the recess of said first bearing part in press-fitted engagement and the other end of the spindle extending through the disc perforation and axial passageway of the second bearing part, the portion of said spindle lying within such perforation and passageway likewise having press-fitted engagement therewith.

2. A disc piston for fluid meters comprising a disc having a central perforation, first and second hemispherical bearing parts made of hard rubber arranged against opposite sides of said disc so as to form a sphere, said first bearing part being formed with a recess extending axially inwardly from its base surface which overlies the disc, the second bearing part being formed with an axial passageway extending completely therethrough, and a spindle operative to secure the thus assembled bearing parts and disc firmly together, one end of said spindle being received in the recess of said first bearing part in press-fitted engagement and the other end of the spindle extending through the disc perforation and axial passageway of the second bearing part, the portion of said spindle lying within such perforation and passageway likewise having press-fitted engagement therewith but being less tightly seized than the end of the spindle received in the recess of said first bearing part.

3. A disc piston for fluid meters comprising a disc having a central perforation, first and second hemispherical bearing parts made of hard rubber arranged against opposite sides of said disc so as to form a sphere, said first bearing part being formed with a recess extending axially inwardly from its base surface which overlies the disc, the second bearing part being formed with an axial passageway extending completely therethrough, and a spindle operative to secure the thus assembled bearing parts and disc firmly together, one end of said spindle being received in the recess of said first bearing part in press-fitted engagement and the other end of the spindle extending through the disc perforation and axial passageway of the second bearing part, the portion of said spindle lying within such perforation and passageway likewise having press-fitted engagement therewith, the end of said spindle received in the recess of said first bearing part having its lateral surface roughened to secure the spindle more tightly to said first bearing part than to said disc and second bearing part.

4. A disc piston comprising a disc having a central perforation, first and second hemispherical bearing parts made of hard rubber arranged against opposite sides of said disc so as to form a sphere, said first bearing part being formed with a recess extending axially inwardly from its base surface which overlies the disc, the second bearing part being formed with an axial passageway extending completely therethrough and a shoulder in the outer portion of said passageway, and a spindle operative to secure the thus assembled bearing parts and disc firmly together, one end of said spindle being received in the recess of said first bearing part in press-fitted engagement, the other end of the spindle extending through the disc perforation and axial passageway of the second part, the portion of said spindle lying within such perforation and passageway likewise having press-fitted engagement therewith, the outer portion of said spindle being of reduced diameter with the shoulder thus provided on the spindle engaged with the shoulder formed in such passageway.

References Cited in the file of this patent

UNITED STATES PATENTS

| | | |
|---|---|---|
| 1,073,387 | Bassett | Sept. 16, 1913 |
| 1,157,666 | Bennett | Oct. 26, 1915 |
| 1,848,419 | Gamon | Mar. 8, 1932 |
| 2,129,257 | Bachmann | Sept. 6, 1938 |
| 2,271,961 | Wakeman | Feb. 3, 1942 |
| 2,464,908 | Volkmann | Mar 22, 1949 |
| 2,635,328 | Larmour | Apr. 21, 1953 |